(12) United States Patent
Ridge

(10) Patent No.: US 7,807,049 B2
(45) Date of Patent: Oct. 5, 2010

(54) METHOD AND APPARATUS FOR RECOVERING OIL FROM OIL SHALE WITHOUT ENVIRONMENTAL IMPACTS

(76) Inventor: Raymond L. Ridge, 133 Spring La., Unit E, Salt Lake City, UT (US) 84117

( * ) Notice: Subject to any disclaimer, the term of this patent is extended or adjusted under 35 U.S.C. 154(b) by 171 days.

(21) Appl. No.: 11/953,706

(22) Filed: Dec. 10, 2007

(65) Prior Publication Data
US 2008/0135457 A1 Jun. 12, 2008

Related U.S. Application Data

(60) Provisional application No. 60/874,194, filed on Dec. 11, 2006, provisional application No. 60/890,341, filed on Feb. 16, 2007, provisional application No. 60/979,510, filed on Oct. 12, 2007.

(51) Int. Cl.
*C10G 1/00* (2006.01)
*B23K 9/00* (2006.01)

(52) U.S. Cl. .............. 208/427; 208/400; 219/121.36; 219/121.37; 204/164

(58) Field of Classification Search ............. 208/427
See application file for complete search history.

(56) References Cited

U.S. PATENT DOCUMENTS

| | | | | | |
|---|---|---|---|---|---|
| 2,958,652 | A | * | 11/1960 | Kirshenbaum et al. | 208/112 |
| 3,703,052 | A | * | 11/1972 | Linden | 208/427 |
| 3,736,247 | A | * | 5/1973 | Jones et al. | 208/409 |
| 3,887,453 | A | | 6/1975 | Ueta et al. | |
| 4,058,205 | A | | 11/1977 | Reed, Jr. | |
| 4,117,886 | A | * | 10/1978 | Honaker | 208/435 |
| 4,297,201 | A | | 10/1981 | Jones et al. | |
| 5,902,554 | A | * | 5/1999 | Kirkbride | 422/141 |
| 6,380,507 | B1 | * | 4/2002 | Childs | 219/121.37 |
| 6,620,092 | B2 | * | 9/2003 | Albus et al. | 588/252 |
| 6,709,573 | B2 | * | 3/2004 | Smith | 208/428 |
| 2003/0024806 | A1 | * | 2/2003 | Foret | 204/164 |

OTHER PUBLICATIONS

Perry, R.H.; Green, D.W. (1997). Perry's Chemical Engineers' Handbook (7th Edition).. McGraw-Hill. Online version available at: http://knovel.com/web/portal/browse/display?_EXT_KNOVEL_DISPLAY_bookid=48 &VerticalID=0.*

(Continued)

*Primary Examiner*—Glenn A Caldarola
*Assistant Examiner*—Michelle L Stein
(74) *Attorney, Agent, or Firm*—Morriss O'Bryant Compagni, P.C.

(57) ABSTRACT

The present invention relates to a method and apparatus for extracting kerogen oil from oil shale without adverse environmental impacts. A first plasma reactor is employed for creating a syngas from a carbon-based fuel. A turbine uses the syngas to produce electricity after the syngas' sensible heat passes through a heat exchanger to heat recycling gases used to pyrolyze the oil shale. A kiln receives the oil shale and heats the oil shale to a temperature at which hydrocarbons from the oil shale are released and captured. The hydrocarbons are sent to a distillation tower to produce a usable fuel. A second plasma reactor vitrifies the spent shale to produce an environmentally inert byproduct. The second plasma reactor is powered by electricity produced by the syngas turbine. Carbon dioxide generated by the process is captured and stored to prevent its release into the environment.

29 Claims, 3 Drawing Sheets

OTHER PUBLICATIONS

"Naphtha." Encyclopedia Britannica Online. Accessed on Oct. 5, 2009.*

DOE report, "Synthetic Fuels Summary", The Engineering Societies Commission on Energy, Inc. (Mar. 1981) (PDF). Synthetic Fuels Summary. Report No. FE-2468-82. United States Department of Energy. pp. 80; 83-84; 90. http://www.fischer-tropsch.org/DOE/DOE_reports/10679_t10/10679_t10_sec05.pdf. Accessed on Oct. 5, 2009.*

"Excerpts from New Scientist Article: Biofuel made from power plant CO2," Posted Oct. 15, 2006, Oilgae Blog, [http://www.oilgae.com/blog/2006/10/biofuel-made-from-power-plant-co2.html], Accessed on Sep. 28, 2009.*

"Excerpts from New Scientist Article: Biofuel made from power plant CO2," Posted Oct. 15, 2006, Oilgae Blog, [http://www.oilgae.com/blog/2006/10/biofuel-made-from-power-plant-co2.html], Accessed on Sep. 28, 2009.*

"Comparison of the Acceptability of Various Oil Shale Processes," Burnham, A.K. and McConaghy, J.R. 26th Oil Shale Symposium, Golden CO. Dec. 11, 2006.

"Oil Shale," Wikipedia. http://en.wikipedia.org/wiki/Oil Shale. Last modified Jan. 27, 2010. Accessed Feb. 15, 2010.

"An Assessment of Oil Shale Technologies." Congress of the United States, Office of Technology Assessment. Jun. 1980.

27th Oil Shale Symposium Report. Oct. 15-19, 2007. Colorado School of Mines. Golden, CO.

Synthetic Fuels Summary 1981. Department of Energy. http://www.fischer-tropsch.org/DOE/DOE_reports/10679_t10/10679_t10_toc.htm. Accessed Feb. 16, 2010.

\* cited by examiner

METHOD AND APPARATUS FOR RECOVERING OIL FROM OIL SHALE WITHOUT ENVIRONMENTAL IMPACTS

CROSS-REFERENCE TO RELATED APPLICATIONS

The present invention claims priority to U.S. Provisional Patent Application Ser. No. 60/874,194 entitled METHOD AND APPARATUS FOR RECOVERING OIL FROM OIL SHALE filed on Dec. 11, 2006, U.S. Provisional Patent Application Ser. No. 60/890,341 entitled METHOD AND APPARATUS FOR RECOVERING OIL FROM OIL SHALE filed on Feb. 16, 2007 and U.S. Provisional Patent Application Ser. No. 60/979,510 entitled METHOD AND APPARATUS FOR RECOVERING OIL FROM OIL SHALE WITHOUT ENVIRONMENTAL IMPACTS filed on Oct. 12, 2007, the entirety of each of which is incorporated by this reference.

BACKGROUND OF THE INVENTION

1. Technical Field

The present invention relates generally to a method and apparatus for recovering oil from oil shale, and more specifically to a method and apparatus for recovering oil from oil shale using plasma gasification to prevent damage to the environment from effluents and contaminated residues.

2. Background

Oil shale is a fine-grained sedimentary rock containing relatively large amounts of kerogen (a solid mixture of organic chemical compound), from which liquid hydrocarbons can be manufactured. The name oil shale is something of a misnomer as the rock is not necessarily a shale and the hydrocarbon in it is not truly oil. It has been common practice in the art to convert the kerogen in oil shale to synthetic crude oil through the chemical process of pyrolysis. When heated to a sufficiently high temperature, a vapor is driven off which is then distilled (retorted) to yield a petroleum-like shale oil.

Oil shale deposits are widely distributed all over the world. More than 600 deposits are known, and their prospective resources are estimated to be over 500 million tons. On dry weight basis, oil shale consist of 10-60 percent of organics, 20-70 percent carbonate minerals and 15 to 60 percent sandy, clay minerals. Oil shale deposits are found on all inhabited continents. Oil shale has gained attention as an energy resource as the price of conventional sources of petroleum has risen, and as a way to secure independence from external suppliers of energy.

While some have been able to extract oil from oil shale using destructive pyrolysis, no one has yet found a way to extract the oil in a commercially profitable manner. Typically, the costs of environmental remediation when added to the costs of extraction exceed the costs of securing crude oil from other deposits. Although many methods have successfully produced oil from oil shale using destructive pyrolysis at approximately $16 to $20/Bbl. (excluding costs of environmental remediation), the conundrum has been to extract the oil profitably without damaging the environment. That is, to be able to extract the oil while generating environmentally inert byproducts.

Oil shale contains both a solid hydrocarbonous mixture (kerogen) and minerals. Kerogen when heated (retorted) yields combustible gases, shale oil, and a solid residue called by different names, e.g., spent shale, retorted shale, processed shale or semicoke. Typically, solid waste of the thermal treatment process, semicoke, is discharged from the retort and disposed in an open dump. Open depositions of semicoke cause distribution of pollutants via air (dust) as well as via aqueous vectors (leaching by rainfall and snowmelt). Leachates from various spent shales have been studied by a number of investigators. Properties of spent shale vary widely with the retorting process, but in general they contain significant amounts of total dissolved solids, sulphate, carbonate, bicarbonate, and other inorganic ions, and lesser amounts of trace elements and organic compounds. Leaching of these materials leach into the surrounding soil has a negative impact on the environment. As such, such practices of dumping byproducts from oil shale processing has been widely discouraged. Thus, as the world has become more environmentally conscious, such oil shale extraction processes have been significantly limited.

Plasma gasification was first developed by NASA to test the ceramic re-entry tiles of the space shuttles. It involves the excitement of gaseous molecules using electricity, which results in a super-heated gas beyond that obtainable by merely heating the gas. Plasma is an ionized gas, i.e. a gas with free-roaming electrons that carries a current and generates a magnetic field. Plasma fields are observable in lightening. It is capable of producing temperatures, which exceed those on the surface of the sun, but can be designed to meet much lower temperature parameters. Neon lights, for example, are a form of plasma. Plasma gasification has primarily been used to date for the processing of municipal waste as an alternative to incineration. By gasifying the waste with plasma, a syngas is generated capable of driving syngas turbines to create electricity. The intense energy causes the molecules to dissociate one from the other and break apart leaving the elemental components of the molecules, a process known as "molecular dissociation."

Syngas (from synthesis gas) is the name given to a gas mixture that contains varying amounts of carbon monoxide and hydrogen generated by the gasification of a carbon based fuel to a gaseous product with a heating value. Examples include the gasification of waste-to energy in municipal and private waste gasification facilities, but can include any carbonaceous material, e.g. "bricks" derived from the production of methanol, animal wastes, old tires or even coal. Syngas consists primarily of carbon monoxide, carbon dioxide and hydrogen and has less than half the energy density of natural gas. Syngas is combustible and often used as a fuel source or as an intermediate for the production of other chemicals. Syngas for use as a fuel is most often produced by gasification of coal or municipal waste. The syngas produced in large waste-to-energy gasification facilities is used as fuel to generate electricity.

Plasma gasification has also been used to remediate soils contaminated with hydrocarbons, resulting in the complete removal of the contaminating hydrocarbons. Recently, Solena Group, Inc., has used plasma gasification to remediate dirty coal plants and produce electricity using the syngas generated from virtually any carbon resource, including, among other fuels, municipal waste, coal and "bricks" which result from ethanol plants where ethanol is derived from renewable feedstocks, e.g., corn stalks. While the Solena Group plasma gasification uses water-cooled electrodes to emit the electrical energy into the gas, MIT has developed a plasma gasification technology that utilizes microwave energy to excite the plasma.

In order to extract oil, gas and byproducts from pyrobituminous shale or other solid materials impregnated with hydrocarbons, some inventors, including among others, John B. Jones et al., U.S. Pat. No. 3,736,247 issued May 29, 1973, and Petroleo Brasileiro S. A. -Petrobras, of Rio de Janeiro, Brazil, U.S. Pat. No. 3,887,453 issued Jun. 3, 1975, developed and patented vertical kiln systems as shown and described in their respective patents, the entirety of which are incorporated herein by this reference and herein-after referenced as the "Paraho/Petrobras systems". While the Paraho/Petrobras systems provide an efficient means of extracting hydrocarbons (95%+ of Fisher Assay), the systems do not adequately address the environmental issues that result from such an extraction process, namely, the creation of environmentally unacceptable byproducts and pollutants, whether from the initial heating process or in the spent shale.

Thus, there exists a need in the art to produce oil from oil shale without harmful or noxious emissions or effluents. There further exists a need to produce oil from oil shale in a manner that reduces thermal pollution, eliminates tailings piles, and reduces excessive excess water requirements (historically associated primarily with compacting the spent shale and planting over the spent shale) while purifying the water used in the production process. There is also a need to completely recover the oil in the oil shale. These and other advantages will be apparent from a reading of the following description of the invention and the appended drawings.

SUMMARY OF THE INVENTION

A method and apparatus for recovering oil from oil shale includes the use of plasma gasification as a heat source, above ground, rather than combusting natural gas or other carbon based fuels, including, among others, the light-ends of the shale oil itself, to create shale oil from the feed stock. Syngas derived from plasma gasification is generated at near atmospheric pressure using plasma gasification which produces the syngas as hot as 3,272 degrees F. and comprised primarily of Hydrogen (approximately 45%), Carbon Monoxide (approximately 42%) and Carbon Dioxide (approximately 11%), which provides heat via a heat exchanger for recirculating gases in a vertical kiln used to extract oil from crushed oil shale feedstock (indirect heating). Hydrocarbon molecules are extracted from a vertical kiln (the heat in the vertical kiln will range from approximately 925 degrees F. to 1382 degrees F. depending on the chemical composition of the oil shale) so as to avoid calcium carbonate decomposition during the retort process, which would otherwise create carbon dioxide in amounts which would have to be separated from the hydrocarbon mist to permit recovery of a full oil product spectrum. Once the shale passes through the vertical kiln, the spent shale is passed through a second plasma gasifier/reactor in order to gasify the coke residue in the spent shale and vitrify the spent shale. Air cooled, such vitrified spent shale is akin to obsidian. Employing a water quench renders the spent shale into a "sand". The second plasma gasifier/reactor is operated at higher temperatures than the retort (e.g., approximately 1200 to 3100 degrees F.), as by electrode or microwaves, to vitrify and discharge the spent feedstock into an environmentally inert, but commercially usable form. Vitrified spent shale can be used as a concrete extender, as a road base or to make other products, such as counter tops, gypsum board, or Rock Wool, or to counteract excess soil acidity. Thus, the method and apparatus also results in the production and ability to sell additional products, which result from the plasma processing of the spent shale. The method and apparatus also includes remediating the environmental damage using plasma gasification to sequester all harmful effluents, remove the residual coke in the spent shale and reduce the spent shale to an environmentally inert state, as defined by the EPA. The carbon dioxide created in the second plasma gasifier can be concentrated and purified for use in industrial processes, sequestered in deep oil or gas wells to stimulate additional production, or directed to an algae farm where the carbon is assimilated by the algae and pure oxygen is released to the atmosphere as demonstrated by GreenFuel Technologies Corporation at the Redhawk power plant west of Phoenix, Ariz., or any similar process utilizing algae to remediate carbon dioxide into assimilated carbon and pure oxygen.

BRIEF DESCRIPTION OF THE DRAWINGS

It will be appreciated by those of ordinary skill in the art that the various drawings are for illustrative purposes only. The nature of the present invention, as well as other embodiments of the present invention, may be more clearly understood by reference to the following detailed description of the invention, to the appended claims, and to the several drawings.

DETAILED DESCRIPTION OF THE ILLUSTRATED EMBODIMENTS

Figure 1:
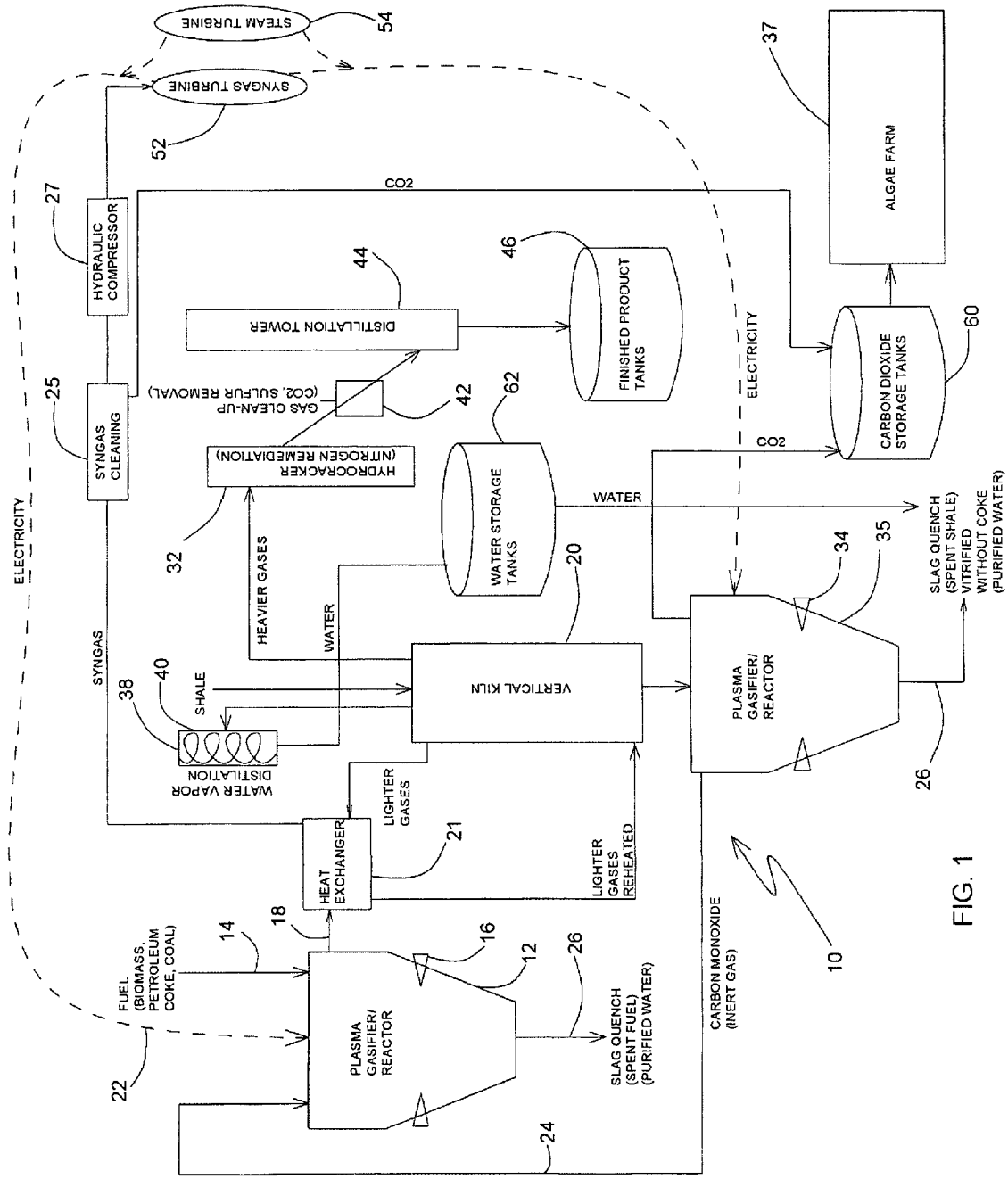
FIG. 1 is a schematic diagram of an apparatus for processing oil shale in accordance with the principles of the present invention.

FIG. 1 is a schematic diagram of an apparatus, generally indicated at 10, for removing oil and other products from oil shale in accordance with the principles of the present invention. The apparatus includes various components configured to process oil shale in a manner in which hydrocarbons are recovered and the remaining byproducts are environmentally inert according to EPA standards. Effectively, the byproducts are not chemically reactive with the environment and do not readily leach into the surround environment if placed back in the soil. Prior to entering the system, the oil shale is first processed into gravel-sized particles having a size that is between about one-quarter inch in effective diameter up to approximately one-half inch in effective diameter. The oil shale may pass through a rock crusher that reduces the size of larger particles of oil shale entering the system. The relatively small size of the oil shale particles allows rapid heat penetration to the core of the particle during the heating process as herein described to release the hydrocarbons from each particle.

An apparatus for processing oil shale, generally indicated at 10, includes a first plasma gasifier or plasma reactor 12 for processing a fuel 14 and carbon monoxide generated during the process for extracting oil from oil shale. The incoming fuel 14 is fed to at least one plasma torch 16 within the plasma reactor 12 at or near atmospheric pressures. The fuel may be in the form of a biomass, such as leftover "bricks" of corn mass that are the byproducts of ethanol production, biodiesel obtained from processing algae in an algae farm, other biomass products known in the art, old tires, petroleum coke, coal or other carbon-based materials of sufficient carbon content to operate as a fuel. As the fuel 14 is heated by the plasma reactor 12, syngas 18 is generated and fed to a heat exchanger 21. Sensible heat from the syngas 18 is utilized to heat recirculating gasses from the vertical kiln 20. Sensible heat is potential energy in the form of thermal energy or heat. The thermal body (i.e., the heat from the syngas) has a temperature higher than its surroundings (i.e., the heat of the recirculating gases). The thermal energy of the syngas 18 is transported via conduction or convection within the heat exchanger 21. The quantity or magnitude of sensible heat is the product of the thermal body's mass, its specific heat capacity and its temperature above a reference temperature. The reference temperature may be room temperature.

Figure 2:
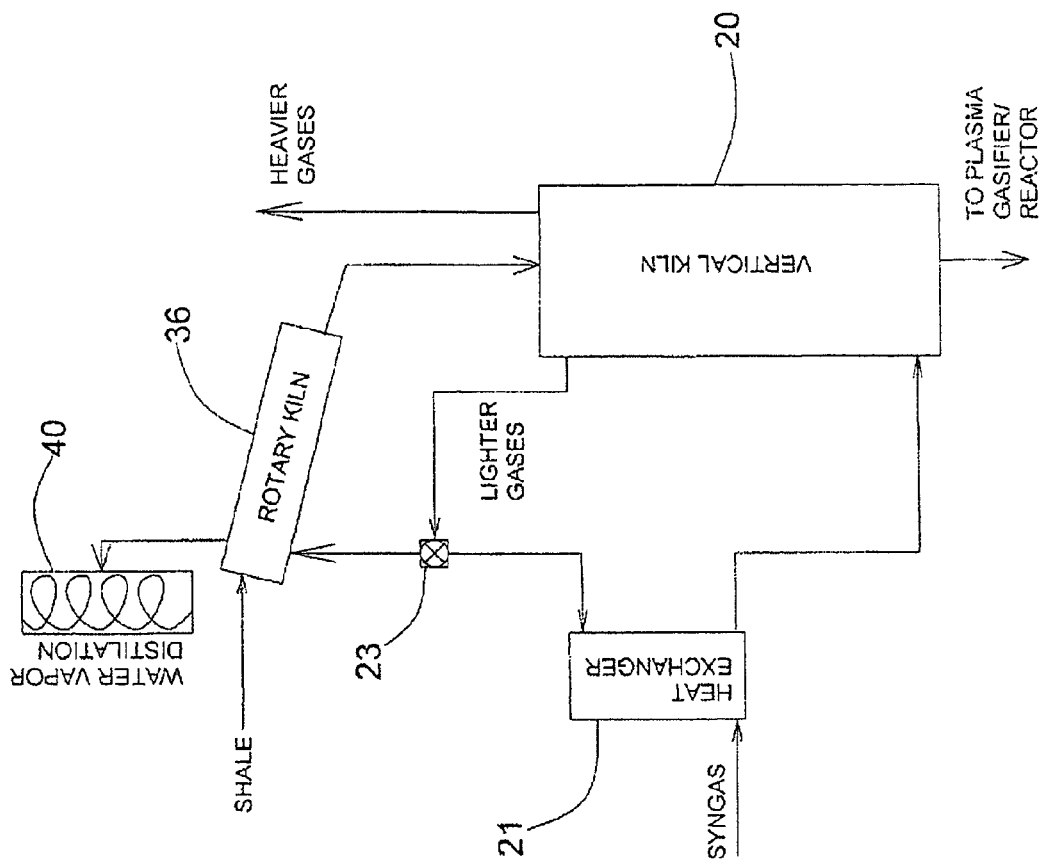
FIG. 2 is a partial schematic diagram of an apparatus for processing oil shale that employs a rotary kiln in combination with a vertical kiln in accordance with the principles of the present invention to remove moisture and naphtha from the oil shale before subjecting the oil shale to complete pyrolysis.

Thus, the heat exchanger 21 serves to reheat inert lighter gases derived from the vertical kiln 20 and the oil shale pyrolysis, which are recirculated back to the vertical kiln 20. As shown in FIG. 2, a preheater rotary kiln 36 may also be employed to preheat and dry the oil shale prior to entry into the vertical kiln 20. The lighter gases are fed to the rotary kiln 36 to help heat the rotary kiln 36. The syngas passes through the heat exchanger 21 separated from the "lighter gases" that are a byproduct of the rotary kiln 36 and the vertical kiln 20. The lighter gases, which may be primarily comprised of naphtha and methane, thus heat the oil shale upon reintroduction to the drying/rotary kiln 36 and the vertical kiln 20.

Referring again to FIG. 1, the plasma torch 16 is powered by electricity 22, which is produced by the syngas turbine 52 and steam turbines 54. An inert gas 24, which may be in whole or in part provided from by-products from a second plasma gasifier/reactor 35, is fed into the plasma gasifier 12 which forms the plasma upon receiving electrical excitement from the electrode torches 16. Resulting slag 26 from the plasma gasifier/reactor 12 is quenched with water recovered from the process, as may be recovered from the water vapor distillation tower 40 and collected in storage tanks 62.

Any carbon dioxide created in the second plasma gasifier 35 is captured for use in commercial applications, for sequestration in deep oil & gas wells, or directed to an algae farm 37, where the carbon is assimilated by the algae and pure oxygen is release to the atmosphere as demonstrated by GreenFuel Technologies Corporation at the Redhawk power plant west of Phoenix, Ariz., or any similar process utilizing algae to remediate carbon dioxide into assimilated carbon and pure oxygen. The carbon dioxide is stored in storage tanks 60.

As better illustrated in FIG. 2, the shale is transferred first to a rotary kiln 36 for moisture and naphtha removal from the oil shale and then to the vertical kiln 20 for heat processing. The rotary kiln 36 is operated at a temperature of approximately 380 degrees Fahrenheit. This preheating process prevents the oil shale from undergoing the "popcorn" effect previously discussed. This preheating process occurs before subjecting the oil shale to complete pyrolysis in the vertical kiln 20 at a temperature that is just below the temperature at which calcium carbonate decomposition begins to occur (i.e., 925 degrees F. to 1,382 degrees F. depending on the composition of the calcium carbonate) releasing vast quantities of carbon dioxide. The naphtha is then separated from the moisture and directed in large measure to a heat exchanger before being introduced into the retort as the primary heat source within the retort to heat the oil shale to pyrolysis at least to 925 degrees F., but below the temperature at which calcium carbonate decomposition begins to occur. The goal is to prevent the generation of carbon dioxide within the retort and limit such formation to the second plasma gasifier/reactor 34.

The temperature at which the rotary kiln 36 is operated is below that which could otherwise cause the shale to "explode," and prevents what is referred to in the industry as the "popcorn effect", whereby the volume of the incoming shale is increased by 10%-20% over that introduced into the process resulting in a byproduct that is difficult to handle and process. The syngas generated by the plasma gasifier 12 is fed into the heat exchanger 21 to heat the recirculating lighter inert gases derived from the rotary kiln 36 and the pyrolysis in the vertical kiln 20 and then directed to the syngas turbine 52, shown in FIG. 1, for the generation of electricity.

The vertical kiln 20 may be of a type shown and described in U.S. Pat. No. 3,736,247 issued May 29, 1973 to John B. Jones et al, or U.S. Pat. No. 3,887,453 issued Jun. 3, 1975 to Ueta et al., both of which are incorporated herein in their entirety by this reference. The use of a vertical kiln 20, as opposed to rotary-type kilns, is more efficient, requiring less energy to operate at the desired temperatures. As such, it may be possible to reduce the size of the first plasma gasifier/reactor 12 since the syngas requirements to operate the vertical kiln 20 are likely less than what is required to operate a rotary kiln at temperatures necessary to release the hydrocarbons from the shale.

After removal of water content from the shale through the rotary kiln 36, the moisture-free shale is fed into the vertical kiln 20 and heated to at least 925 degrees F. The heat in the kiln causes the hydrocarbons to vaporize into a mist. In addition, by keeping the temperature below that at which the decomposition or breakdown of calcium carbonate occurs, thereby creating lime and carbon dioxide, such decomposition is relegated to the second plasma gasifier/reactor so that only hydrocarbon mist is created in the retort. Furthermore, the kiln may be operated in a carbon monoxide environment to reduce oxygen reaction with the released hydrocarbons that produce carbon dioxide as is the case in an oxygen-rich environment. The vaporized hydrocarbons, labeled as "Heavier Gases", are fed into a hydrocracker 32 for nitrogen remediation.

Referring again to FIG. 1, the spent shale is then fed through a high-heat zone generated by a second plasma gasifier/reactor 35 having a set of torches 34 which raises the temperature of the spent shale to as much as 3100 degrees F. The second plasma gasifier/reactor 35 vitrifies the surface of the spent shale. Any resulting carbon monoxide and/or other inert gases may be sent to the first plasma gasifier/reactor 12.

Again, as illustrated in FIG. 2, the rotary kiln 36 is employed to preheat the shale to a temperature of 380 degrees F. before introducing the shale to the vertical retort 20. This preheating of the shale causes water contained in the shale to be vaporized to be recovered in the water distillation tower 40 and allows use of the naphtha as a recycling gas in the retort. By removing the water content from the shale, the "popcorn" effect of the shale entering the vertical kiln 20 will be significantly reduced or eliminated. The shale is then fed into the kiln 20 in which the shale is heated to at least 925 degrees F., but always at a temperature below that at which calcium carbonate decomposition occurs.

The second plasma gasifier/reactor 35 vitrifies the surface of the spent shale to create an environmentally acceptable byproduct. This stage is very rapid, a matter of a few seconds, to sear the outside surface of each particle to remove coke and to glassify the exterior surface of the individual particles to make them environmentally inert, at least according to EPA standards. This resulting slag is quenched with water reclaimed by the water vapor 38 that is recovered from the rotary kiln 36 and distilled in distilling tower 40. As discussed herein, the spent shale byproduct can be used in various products, including but not limited to road base, counter tops, gypsum board, cement, Rock Wool, and as a soils ph balancing product.

Once the hydrocarbons have been vaporized, the hydrocarbons are processed first in the hydrocracker 32 for nitrogen and sulfur remediation and secondly by a gas clean-up 42 in which carbon dioxide, sulfur and various other compounds are removed. The carbon dioxide is fed to the storage tanks 60. The remaining hydrocarbons are fed to a distillation tower 44 to distill the hydrocarbons. The finished liquid products are then fed into tanks 46.

In order to supply electricity to both plasma gasifiers 16 and 34, the syngas 50 is employed in the syngas turbine 52 to generate electricity. Prior to introduction of the syngas into the syngas turbine 52, the syngas may need to go through syngas cleaning 25 to remove particles and/or caustic substances that may be corrosive or otherwise damaging to the syngas turbine 52. In addition, it may be desirable or necessary to employ a hydraulic compressor 27 to generate a flow of syngas into the syngas turbine 52. In addition, a steam turbine 54 may be provided to generate additional electricity that may be required for the plasma reactors 12 and 35.

In one embodiment of the invention, the plasma gasifiers/reactors 16 and 35 are equipped with high-efficiency and high-power atmospheric pressure plasma utilizing microwave plasma sources. Such a plasma torch is disclosed in "Efficient, Modular Microwave Plasma Torch for Thermal Treatment" by Kamal Hadidi and Paul Woskov of the Plasma Science and Fusion Center of MIT, incorporated herein by this reference and attached hereto as Appendix C. The use of such a plasma torch eliminates the need for the electrodes found in traditional plasma torch technologies in which the plasma torch electrodes have a limited lifetime and thus require frequent replacement, thereby increasing maintenance costs. Microwave plasma torches, however, should not be susceptible to the same limited lifetime issues, and therefore should reduce the cost of maintenance and replacement that is typically associated with plasma gasification which currently employs water-cooled copper electrodes. In addition, the use of microwave plasma torches eliminates the possibility of an explosion that could otherwise occur if water is introduced into the plasma as the result of a leak from the water-cooled electrodes.

Figure 3:
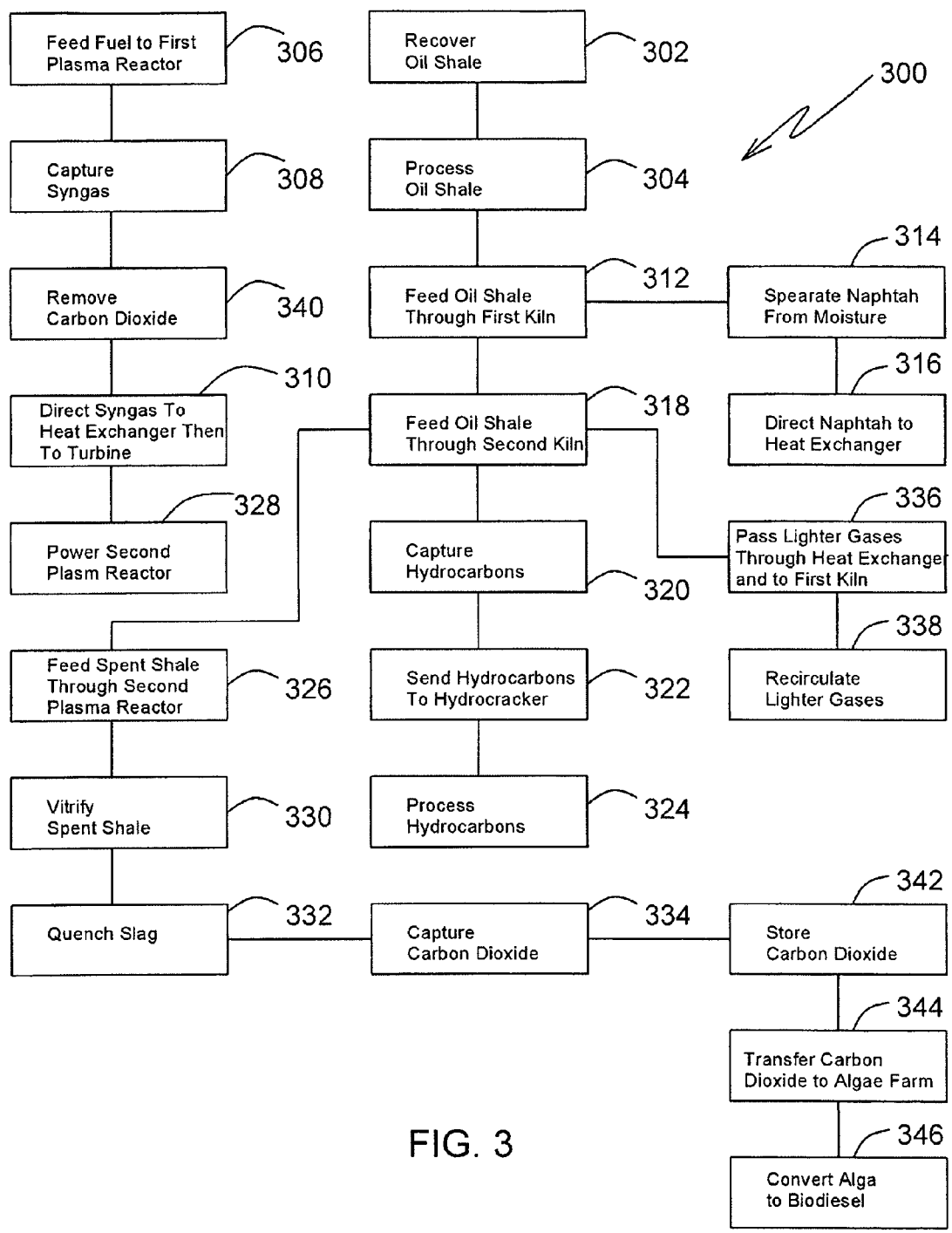
FIG. 3 is a schematic flow diagram of a method for processing oil shale in accordance with the principles of the present invention.

Referring now to FIG. 3, there is illustrated a method, generally indicated at 300, for extracting kerogen oil from raw or virgin oil shale. The raw oil shale is recovered 302 from earthen formations by mining. Once mined, the oil shale is processed 304 to reduce the particle size of the oil shale from approximately one quarter inch to approximately one half inch in effective diameter. It is important to control the size of the oil shale particles entering the system of the present invention in order to ensure that each particle and thus all of the oil shale is heated to its core during the kerogen extraction process to remove substantially all of the hydrocarbons from the oil shale and to ensure that the vitrification of the oil shale particles is sufficient to create an environmentally inert byproduct.

In order to operate the processing facility, and more specifically, to operate the plasma reactors, a fuel is fed 306 into a first plasma reactor to create a syngas. The syngas is captured 308 and directed 310 to a syngas turbine to produce electricity.

Once the oil shale is processed 304 to an appropriate size, it is first fed 312 through a first kiln, such as a rotary kiln in order to preheat the oil shale and to remove moisture and naphtha from the oil shale. The naphtha is separated 314 from the moisture generated in the rotary kiln and directing 316 to the heat exchanger.

The oil shale is then fed 318 through a second kiln, such as a vertical or horizontal kiln to release hydrocarbons from the oil shale. The hydrocarbon containing gases from the vertical kiln are captured 320 and sent 322 to a hydrocracker to reduce nitrogen and sulfur gases to acceptable levels. The hydrocarbons are then processed 324 into usable fuels, such as kerosene, gasoline, diesel/jet fuel and/or fuel oil. The spent shale is fed 326 into a second plasma reactor that is powered 328 at least partially by electricity from the syngas turbine. The second plasma reactor vitrifies 330 the spent shale to create an environmentally inert byproduct. As part of the vitrification, the spent shale is heated to a temperature that gasifies the carbon or coke present within and on the outer surface of the spent shale in the second plasma reactor.

In order to vitrify the spent shale, the second plasma reactor is operated at a temperature ranging from about 1600-3100 degrees Fahrenheit, depending on the residence time required for surface vitrification. The vitrified slag exiting the second plasma reactor is quenched 332 with water recovered from the rotary kiln. In addition, in order to provide plasma torches that require relatively little maintenance and provide superior performance, microwave plasma torches are provided in the first and second plasma reactors.

As the spent shale is fed into and processed in the second plasma reactor, the carbon dioxide created by the vitrification of the spent shale is captured 334 to prevent it from entering the atmosphere. Residual lighter gases from the vertical kiln are passed 336 through a heat exchanger along with directing 310 syngas from the first plasma reactor to heat the lighter gases. Sensible heat from the syngas is transferred to the lighter gases. The lighter gases are then recirculated 338 back through the vertical kiln to heat the vertical kiln to the desired temperature. The vertical kiln is operated at a temperature below the temperature at which calcium carbonate in the oil shale will decompose into lime and carbon dioxide, which is a temperature of between approximately 925 degrees Fahrenheit and 1382 degrees Fahrenheit depending on the composition of the calcium carbonate in the oil shale. The recycling gases derived from the kilns are inert without the presence of oxygen, such that no combustion occurs in the vertical kiln to create carbon dioxide as the oil shale is heated.

In addition, the lighter gases from the vertical kiln are directed 336 to the rotary kiln in order to heat the rotary kiln to the desired temperature. The rotary kiln is operated at a temperature of approximately 380 degrees Fahrenheit to prevent a popcorn effect of the oil shale when heated. Substantially all of the carbon dioxide produced by the first plasma reactor is removed 340 from the syngas prior to entering the syngas turbine.

The carbon dioxide is stored 342 for use in at least one of a commercial gas industry, sequestration in deep oil or gas wells to improve production, or an algae farm to allow algae to absorb the carbon molecules and release oxygen molecules into the atmosphere. In the case of an algae farm, the carbon dioxide is transferred to the algae farm to be absorbed by the algae. The algae are converted 346 into biodiesel for use as fuel.

The use of plasma gasification, according to the present invention, has many advantages. For example, with plasma gasification, multiple fuels can be used in the process, resulting in reduced power costs over the savings of using coal, e.g., "bricks" from ethanol plants, old tires, municipal wastes, animal wastes, etc. In addition, greater heat ranges are possible, from lower temperatures to that exceeding the temperature of the Sun. Cogeneration of excess electricity for other elements in the plant is also possible. Simple capture of steam from the slag quench can be used to drive the steam turbine. The process is operated at atmospheric pressures, rather than the 300-400 psi needed to achieve temperatures in excess of 2,000 degrees Fahrenheit from traditional coal gasification processes, which also require the use of pure oxygen to achieve such temperatures, the production of which requires significant additional capital expenditures. This advantage of plasma gasification allows easier coordination with low-pressure vessels, e.g. kilns or retorts. The process does not produce any fly ash that can gum-up the furnaces, the heat exchanger or the kilns. The syngas has a relatively low carbon dioxide content. There are no emissions of greenhouse gases or noxious fumes. Water is purified resulting from the quenching process. Valuable residual products are generated from the slag. There is complete recovery of value-added, finished petroleum products. Even residual coke is gasified rather than recaptured using solvents. Less time is dedicated to maintenance resulting in more production revenue, as much as one additional month per year. The facility can be constructed in steel yards and shipped to the site on flat-bed trucks rather than having to be built in the wilderness from scratch resulting in time and labor savings, and reducing demands on local infrastructure. The facility is comparable if not lower in cost to construct and maintain. The slag is proven to be inert resulting in absolutely no environmental damage (already recognized by the EPA as "environmentally acceptable") and has possible uses in other products allowing for removal of spent shale for those uses and resulting in no tailings piles.

In accordance with the use of the apparatus of the present invention, and in particular, the use of plasma gasification for the processing of oil shale, the resulting byproducts have no harmful or noxious emissions or effluents. Even carbon dioxide can be captured and sold for sequestration to improve production in oil and gas wells, together with sulfur and any excess hydrogen. There is reduced thermal pollution by distilling finished products on-site from vaporized hydrocarbons without need for reheating at a remote refinery. There are no tailings piles because the coke on the spent shale is completely gasified, thereby rendering the spent shale usable for numerous other uses, including, among other products, gypsum board, counter-tops, building block, bricks, Rock Wool, roof and road sealants, road base aggregate, Portland Cement, gypsum board, cement extender and soil ph remediation. Recovering moisture contained in the oil shale also produces water. This water is purified, resulting from the high temperature of the vitrified, spent shale and carbon slag being quenched. All petrochemicals are completely recovered that are contained within the shale in the three heat stages. The heating in stages prevents (i) thermal cracking/deterioration of the most valuable fuels and (ii) the release of unacceptable levels of carbon dioxide resulting from combustion and/or calcium carbonate decomposition. In addition, any finished petroleum products, such as kerosene, gasoline, diesel/jet fuel and heating oil, can be distilled on-site with enhanced values in excess of refinery feed stock (a wind-fall of approximately $10.00/Bbl. over refinery feed stock prices). The method and apparatus of the present invention also reduces power costs by using less expensive fuels to generate heat and provide for the cogeneration of all electrical needs within the mine and plant using the syngas derived from the plasma gasification and enhanced with the "light-ends" from the oil shale.

The present invention relates to an apparatus and method for processing oil shale to produce oil in which the spent shale is rendered into an inert state that is environmentally acceptable. It will be appreciated by those skilled in the art that the embodiments herein described, while illustrating certain embodiments, are not intended to so limit the invention or the scope of the appended claims. Those skilled in the art will also understand that various combinations or modifications of the embodiments presented herein can be made without departing from the scope of the invention. For example, it will be appreciated that the methods and systems discussed herein, while particularly suited for processing oil shale could be adapted to process other hydrocarbon sources, such as coal. All such alternate embodiments are within the scope of the present invention.

What is claimed is:

1. A method of extracting kerogen oil from oil shale while reducing adverse environmental impacts, comprising:
   feeding a fuel through a first plasma reactor to create a syngas;
   removing carbon dioxide from the syngas;
   capturing the syngas from the first plasma reactor;
   directing the syngas to a heat exchanger which transfers heat from the syngas to recirculating gases of a vertical kiln that are separate from the syngas to thereby heat oil shale in the vertical kiln;
   circulating the recirculating gases through the heat exchanger to continually heat the oil shale in the vertical kiln;
   directing the syngas from the heat exchanger to a turbine to produce electricity;
   feeding oil shale through the vertical kiln to release hydrocarbons from the oil shale to create spent shale;
   capturing the hydrocarbons from the vertical kiln;
   processing the hydrocarbons to produce at least one usable fuel;
   feeding the spent shale through a second plasma reactor to vitrify the spent shale, the second plasma reactor being powered at least in part by electricity produced by the turbine; and
   capturing substantially all of the carbon dioxide present in the second plasma reactor to prevent the carbon dioxide from entering the atmosphere.

2. The method of claim 1, further comprising feeding the oil shale through a rotary kiln prior to feeding the oil shale through the vertical kiln to preheat the oil shale and to remove moisture from the oil shale.

3. The method of claim 2, further comprising circulating the syngas and the recycling gases derived from the vertical kiln and rotary kiln to a heat exchanger, to utilize sensible heat of the syngas in heating the recycling gases derived from the vertical kiln and rotary kiln to heat the oil shale in the vertical kiln and rotary kiln.

4. The method of claim 3, further comprising capturing substantially all of the carbon dioxide from the syngas before the syngas enters the turbine.

5. The method of claim 4, further comprising circulating gases derived from the vertical kiln to the rotary kiln to provide heat to the rotary kiln.

6. The method of claim 1, further comprising providing the carbon dioxide for use in at least one of a commercial gas industry, sequestration in deep oil or gas wells to improve production, and an algae farm to allow algae to absorb the carbon molecules and release oxygen molecules into the atmosphere.

7. The method of claim 6, further comprising processing the algae into biodiesel for use as fuel.

8. The method of claim 2, further comprising operating the rotary kiln at a temperature of approximately 380 degrees Fahrenheit to prevent a popcorn effect of the oil shale when heated to a higher temperature.

9. The method of claim 1, further comprising operating the vertical kiln at a temperature below the temperature at which calcium carbonate in the oil shale will decompose into lime and carbon dioxide.

10. The method of claim 9, further comprising operating the vertical kiln at a temperature of between approximately 925 degrees Fahrenheit and 1382 degrees Fahrenheit depending on the composition of the calcium carbonate in the oil shale.

11. The method of claim 2, further comprising separating naphtha from the moisture generated in the rotary kiln and directing the naphtha to the heat exchanger.

12. The method of claim 1, further comprising operating the vertical kiln in a carbon monoxide environment to reduce the formation of carbon dioxide as the oil shale is heated in the vertical kiln.

13. The method of claim 1, wherein the second plasma reactor is operated at a temperature of up to 3100 degrees Fahrenheit to render the spent shale environmentally inert.

14. The method of claim 1, further comprising quenching slag exiting the second plasma reactor with water recovered from the rotary kiln.

15. The method of claim 1, further comprising sending gases from the vertical kiln to a hydrocracker to upgrade the hydrocarbons by reduction of nitrogen and sulfur levels in association with the hydrocarbons.

16. The method of claim 1, further comprising using microwave plasma torches in at least one of the first and second plasma reactors.

17. The method of claim 1, further comprising gasifying carbon present in and on the spent shale in the second plasma reactor.

18. A method of extracting kerogen oil from oil shale while reducing adverse environmental impacts, comprising:
supplying a fuel through a first plasma reactor to create a syngas;
supplying the syngas to a heat exchanger;
feeding oil shale through a vertical kiln;
circulating lighter gases produced in the vertical kiln through the heat exchanger to transfer heat from the syngas by convection or conduction to the lighter gases;
circulating the syngas heated lighter gases back through the vertical kiln to heat the oil shale causing the oil shale to release both lighter and heavier gases and to create spent shale;
separating the lighter gases from the heavier gases;
recirculating the lighter gases through the heat exchanger and vertical kiln to heat the oil shale;
processing the heavier gases to produce a fuel; and
feeding the spent shale through a second plasma reactor to vitrify the spent shale into an environmentally acceptable by product.

19. The method of claim 18, wherein the lighter gases are comprised of methane and naphtha and the heavier gases are hydrocarbon vapors.

20. The method of claim 19, further comprising supplying the syngas from the heat exchanger to a turbine to produce electricity for at least one of the first and second plasma reactors.

21. The method of claim 18, further comprising removing carbon dioxide from the syngas.

22. The method of claim 21, further comprising capturing substantially all of the carbon dioxide generated in the first and second plasma reactors to prevent the carbon dioxide from entering the atmosphere.

23. The method of claim 18, further comprising feeding the oil shale through a rotary kiln prior to feeding the oil shale through the vertical kiln to preheat the oil shale and to remove moisture from the oil shale.

24. The method of claim 23, further comprising circulating the syngas and the recycling gases derived from the vertical kiln and rotary kiln to a heat exchanger, to transfer the heat from the syngas to the lighter gases while keeping the syngas separate from the lighter gases.

25. The method of claim 23, further comprising operating the rotary kiln at a temperature of approximately 380 degrees Fahrenheit to prevent a popcorn effect of the oil shale when heated to a higher temperature.

26. The method of claim 18, further comprising processing the oil shale to reduce a particle size of the oil shale to be between approximately one quarter to approximately one half inch in effective diameter.

27. The method of claim 18, further comprising operating the vertical kiln at a temperature of between approximately 925 degrees Fahrenheit and 1382 degrees Fahrenheit depending on the composition of the calcium carbonate in the oil shale.

28. The method of claim 23, further comprising separating naphtha from the moisture generated in the rotary kiln and directing the naphtha to the heat exchanger.

29. The method of claim 18, further comprising operating the kiln in a carbon monoxide environment to reduce the formation of carbon dioxide as the oil shale is heated in the vertical kiln.

\* \* \* \* \*